Jan. 25, 1927.

M. R. DE FRANCE 1,615,573

METHOD OF MAKING BRAKE SHOES

Filed Oct. 12, 1921   2 Sheets-Sheet 1

INVENTOR
Murrell R. De France
by William B. Wharton
his attorney

Jan. 25, 1927.                                                      1,615,573
M. R. DE FRANCE
METHOD OF MAKING BRAKE SHOES
Filed Oct. 12, 1921         2 Sheets-Sheet 2

INVENTOR
Murrell R. DeFrance
by William B. Wharton
his attorney

Patented Jan. 25, 1927.

1,615,573

UNITED STATES PATENT OFFICE.

MURRELL R. DE FRANCE, OF BELLEVUE, PENNSYLVANIA, ASSIGNOR, BY DIRECT AND MESNE ASSIGNMENTS, TO THE AMERICAN BRAKE SHOE AND FOUNDRY COMPANY, OF NEW YORK, N. Y., A CORPORATION OF DELAWARE.

METHOD OF MAKING BRAKE SHOES.

Application filed October 12, 1921. Serial No. 507,309.

This invention relates to a method of making brake shoes.

When a frictional composition is pressed while moist in a pressed metal brake shoe shell the entire mass does not harden uniformly throughout. While the outer portion on and adjacent the wearing face of the composition block thus formed hardens sufficiently to present a proper resistance to crushing for each unit of its mass, the portion of the composition which lies adjacent the back of the shell does not so harden as to present a sufficiently great resistance to crushing for each unit of its mass.

When therefore a shoe so hardened becomes worn thin with continued use there is great likelihood that it may be crushed or distorted in further service.

One object of the invention is, therefore, to provide a method whereby the filling composition may be hardened thoroughly and uniformly throughout and thereafter combined with a pressed metal shell to provide a complete composition brake shoe.

Another object of the invention is to secure the block or briquette of filling composition in the pressed metal shell of the brake shoe, and to embody in the filling block or briquette means which serve not only to insure a secure engagement of the filler in the shell of the brake shoe, but which also serve to reinforce the back of such shell.

Figure 1:
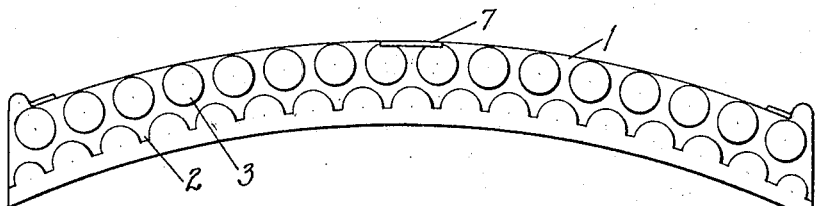
Figure 2:
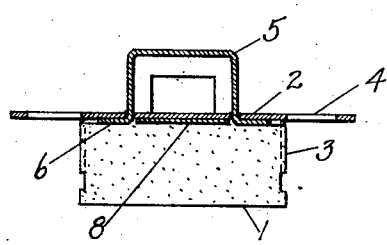
Figure 4:
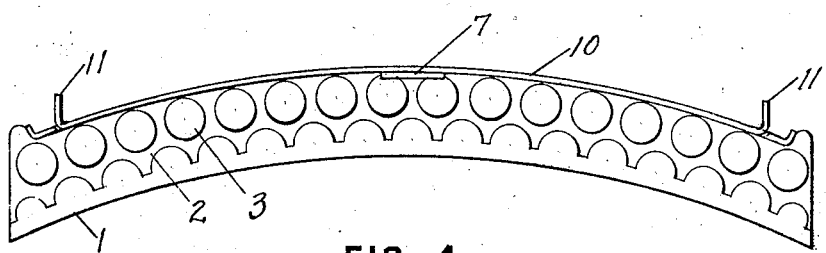
Figure 3:
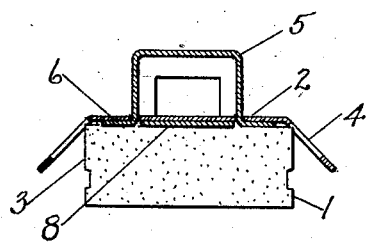
Figure 5:
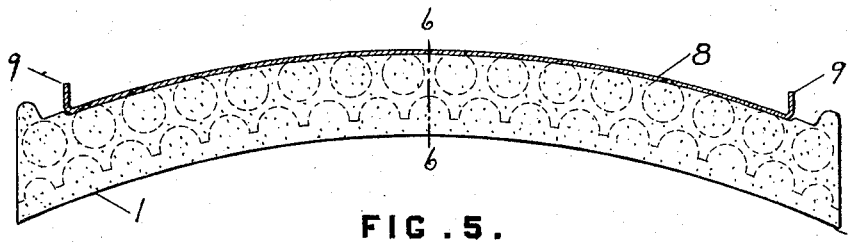
Figure 6:
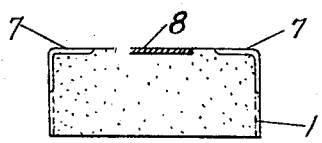
Figure 7:
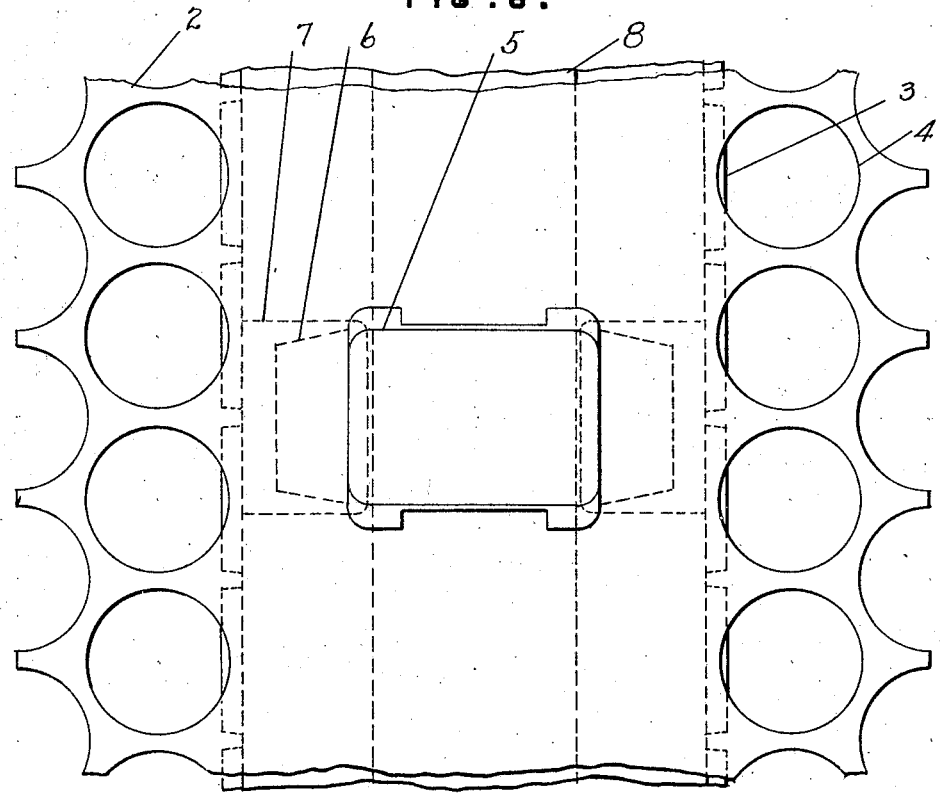

In the acompanying drawings Figure 1 is a side elevation of a complete briquette of a frictional filling composition for a brake shoe; Figure 2 is a cross sectional view through the filling briquette and the pressed metal shell of the brake shoe showing the shell in position to be folded around the briquette; Figure 3 is a similar view showing the shell partially folded around the briquette, Figure 4 is a side elevation of a briquette showing an attaching and reinforcing plate applied to the upper surface or back thereof; Figure 5 is a central vertical section through the briquette showing an attaching and reinforcing plate embedded in the upper portion thereof; Figure 6 is a cross sectional view therethrough on the line 6—6 Figure 5; and Figure 7 is a fragmentary plan view showing a pressed metal shell in position to be folded around a briquette.

In making a brake shoe according to the method of the present invention the ingredients of the frictional filling composition are first mixed and are pressed or molded into proper shape to be fitted into a shell of the desired form to constitute a complete brake shoe. One suitable composition for the purpose may be made by mixing in proper proportions a fibrous material such as asbestos, a friction increasing material such as metallic borings or fillings, a body or filler such as powdered coke, and a binding material such as linseed oil.

The briquette is then permitted to harden in the air, and the metallic shell of the brake shoe is folded around it in the manner shown particularly in Figures 2 and 3 of the drawings.

The briquette 1 may be made of a form to fit any pressed metal casing. As illustrated, it is designed particularly for use with a shell such as that illustrated and described in my prior Patent No. 1,321,897, dated November 18, 1919 and in my copending application Serial No. 507,308, filed October 12, 1921.

When used with a pressed metal shell 2 having unperforated sides, the sides of the briquette are preferably plain. With a shell having reticulated sides such as shown in the patent and application noted, however, protuberances or bosses 3 arranged to enter the apertures 4 in the sides of the shell are preferably provided. This is because it is desirable to have any metal of the brake shoe which comes in contact with a vehicle wheel backed and surrounded by the composition of the shoe. The direct purpose of surrounding all metal by composition is to prevent the metal from one point on the side of the brake shoe shell being dragged along in such manner as to pile up on another point thereon. In such case the knob of metal thus formed would be likely to cut or bruise the tread of a wheel or the brake drum on which the brake shoe is used.

The briquette 1 and shell 2 are also shown in conjunction with the brake shoe lug described and claimed in the copending application of Guy L. McIntyre, Serial No. 506,258 filed October 8, 1921. This lug 5 is secured to the brake shoe shell 2 by means of tongues 6 turned under the back of the shell.

The back of the briquette is shown as provided with recesses 7 for receiving the tongues 6 when the brake shoe shell is folded around the briquette.

Both the protuberances or bosses 3 and the recesses 7 when employed are preferably formed during the operation of pressing the briquette.

The briquette may be cemented directly into the brake shoe shell when the latter is folded around it. If desired, however, metallic attaching means may be imbedded in or otherwise secured to the briquette. Such attaching means may be of any form suitable for the purpose, but are shown as metallic plates similar to those illustrated and described in my copending application Serial No. 507,308, filed October 12, 1921.

This plate 8, may be relatively narrower as shown in all figures of the drawings save Figures 1 and 4. In such case the ends 9 of the plate itself may be upturned and utilized to attach the plate and briquette to the back of the brake shoe shell. If the plate be of a width less than that of the briquette it is preferably imbedded in the upper side thereof.

In Figure 4 of the drawings is shown a plate 10 of greater width than the one shown in the other figures of the drawings. It is undesirable that the slot for receiving the locking portion of the plate extend across too great a proportion of the width of the back of the brake shoes shell, as such slot would unduly weaken the back of the shell. If, therefore, a plate of relatively great width be employed a tongue 11 is preferably cut and struck up from the metal of the plate to serve as the direct attaching means.

The great advantage of a brake shoe formed according to the method of the present invention is that the filling composition is thoroughly hardened throughout, and thus presents throughout its mass the requisite resistance to crushing and distortion.

A further advantage lies in the special attaching means shown, which serve not only to secure the briquette firmly to the shell of the brake shoe, but also serves as a reinforcement for the back of the shell.

When the metallic attaching or reinforcing means are embedded in the briquette they also provide means whereby a briquette may be lifted and handled while in a semi-plastic state without danger of injury to the briquette.

What I claim is:

1. The method of making brake shoes which consists in forming a briquette of a frictional composition and embedding a metallic plate in the back thereof while the composition is in a plastic condition, permitting the briquette to harden, and then pressing a metallic shell around the briquette.

2. The method of making brake shoes which consists in and with a briquette of a frictional composition forming protuberances on its sides and embedding a metallic plate in the back thereof while the composition is in a plastic condition, permitting the briquette to harden, and then pressing a metallic shell around the briquette in such manner that the protuberances on the sides of the briquette enter apertures in the sides of the shell.

In witness whereof, I hereunto set my hand.

MURRELL R. DE FRANCE.